United States Patent
Carkner et al.

(10) Patent No.: US 9,680,318 B2
(45) Date of Patent: Jun. 13, 2017

(54) MODULAR SHARE PACK BATTERY

(71) Applicant: Revision Military S.a.r.l., Luxembourg (LU)

(72) Inventors: Steve Carkner, Ottawa (CA); Len Donais, Ottawa (CA); Eric Lanoue, Ottawa (CA)

(73) Assignee: Revision Military S.a.r.l., Luxembourg (LU)

( * ) Notice: Subject to any disclaimer, the term of this patent is extended or adjusted under 35 U.S.C. 154(b) by 132 days.

(21) Appl. No.: 13/967,238

(22) Filed: Aug. 14, 2013

(65) Prior Publication Data
US 2014/0049208 A1    Feb. 20, 2014

Related U.S. Application Data

(60) Provisional application No. 61/683,119, filed on Aug. 14, 2012.

(51) Int. Cl.
*H02J 7/00* (2006.01)
*H01M 2/10* (2006.01)
(Continued)

(52) U.S. Cl.
CPC ......... *H02J 7/0042* (2013.01); *H01M 2/1005* (2013.01); *H01M 2/1027* (2013.01);
(Continued)

(58) Field of Classification Search
CPC ................. H01M 2/1005; H01M 10/4257
(Continued)

(56) References Cited

U.S. PATENT DOCUMENTS

| 5,211,321 A | 5/1993 | Rodriguez |
| 7,944,662 B2 | 5/2011 | Carkner |

(Continued)

FOREIGN PATENT DOCUMENTS

WO    WO 2011/106431    9/2011

OTHER PUBLICATIONS

Preparing Activity: Army—CR (Project No. 6140-2010-012). MIL-PRF-32383/3, Performance Specification Sheet: Battery, Rechargeable, Sealed, BB-2590()/U, BB-390()/U, and BB-3590()/U.
(Continued)

*Primary Examiner* — Thuan Do
(74) *Attorney, Agent, or Firm* — Wolf, Greenfield & Sacks, P.C.

(57) ABSTRACT

Described is an energy share pack comprising a housing, at least one energy storage component within the housing, at least one energy conversion component within the housing, and a connection point for connecting to more than one of energy users, energy sources and other energy share packs simultaneously for sharing energy. The energy share pack may have an energy generation component for generating harvestable energy, and two or more ports of any combination of the following types: bidirectional power port, bidirectional USB port, unidirectional output power port, and unidirectional input power port. The share pack ports may operate simultaneously at different voltage levels, and at least one port may be bi-directional. Furthermore, the share packs may have an integrated display for providing information on the energy share pack in which the display is integrated and information about other energy share packs connected thereto.

18 Claims, 7 Drawing Sheets

(51) Int. Cl.
  *H01M 2/20*    (2006.01)
  *H01M 10/48*   (2006.01)
  *H01M 6/42*    (2006.01)
(52) U.S. Cl.
  CPC ......... *H01M 2/204* (2013.01); *H01M 10/488* (2013.01); *H01M 6/42* (2013.01); *H01M 2220/30* (2013.01)
(58) Field of Classification Search
  USPC ........................................................ 320/103
  See application file for complete search history.

(56) References Cited

U.S. PATENT DOCUMENTS

| | | | |
|---|---|---|---|
| 2005/0266300 A1 | 12/2005 | Lamoreux et al. | |
| 2009/0058361 A1* | 3/2009 | John | 320/128 |
| 2010/0315043 A1* | 12/2010 | Chau | B60L 3/0046 320/134 |
| 2011/0006603 A1* | 1/2011 | Robinson | G06F 1/263 307/31 |

OTHER PUBLICATIONS

Extended European Search Report for Application No. 13180468.4, dated Nov. 6, 2013.
Examination Report for European Application No. 13180468.4, dated Mar. 14, 2016.

\* cited by examiner

MODULAR SHARE PACK BATTERY

This application claims the benefit of U.S. Provisional Application Ser. No. 61/683,119, filed Aug. 14, 2012, the substance of which is incorporated herein in its entirety.

FIELD OF THE INVENTION

This invention pertains to the field of batteries and power systems, and particularly to systems designed to be worn on the body. The field includes the battery itself, as well as other power systems and accessories that may be associated with the battery pack.

BACKGROUND OF THE INVENTION

Battery systems, in particular rechargeable batteries, are often custom designed and manufactured for a particular purpose, tool or end use. In some situations these batteries have become de facto standards such as the BB2590 rechargeable lithium battery which was originally designed for use in military applications, but can now be found powering industrial and even consumer products.

Power tool manufacturers often develop one battery pack for their line of tools and allow one or more of these batteries to plug into each individual tool. In this way, the battery can be moved from tool to tool as required.

In military applications, soldiers may carry many different sizes, capacities and types of batteries. A mixture of rechargeable, non-rechargeable and even other power technologies such as fuel-cells and solar panels may be carried into the field by a soldier. This power equipment is a major weight burden on the soldier and can reduce their effectiveness and mobility in the field to the point where their safety is compromised.

Portable battery systems are often carried in custom made pouches, or attached to clothing, back-packs, belts or other items of clothing on the person's body. The distribution and re-distribution of this weight is dictated by the situation and in some cases the addition of extra battery packs is simply not possible due to the limitations of available battery pouches or attachment devices. The comfort level of these systems is also poor with the square batteries providing an irritant to the naturally curved shape of the human body.

There remains a need for a system to improve the way batteries are carried. There is also a need to allow multiple pieces of equipment, at different voltage levels, to be operated from a single common battery, battery pack or energy system. There further exists a need for a reconfigurable battery pack and power system that would allow the user to combine batteries in a wide variety of ways to provide the exact voltage, current, capacity, size, weight and form factor that the user requires at that time. We have named the concept of this reconfigurable energy sharing battery pack energy conversion system a SharePack™. The invention will be referred to as an energy share pack throughout this document.

SUMMARY OF THE INVENTION

In order to overcome the deficiencies noted above, we propose as a solution our invention, namely, a flexible power system that includes reconfigurable shapes, sizes, capacity, output ability and input abilities. The system, referred to as an energy share pack, may include features normally associated with a battery, namely energy storage, and features normally associated with other power systems such as energy control, voltage converters, digital displays and communications.

DETAILED DESCRIPTION OF THE INVENTION

The desire for a unified power system that can store, deliver, harvest and share energy is addressed by the energy share pack which may take several forms while retaining the unique combination of features which allows the energy share pack to replace multiple pieces of equipment for a soldier, industrial worker, police officer, or in any application where there is a desire for multiple pieces of electronic gear to be operated at the same time.

Figure 1:
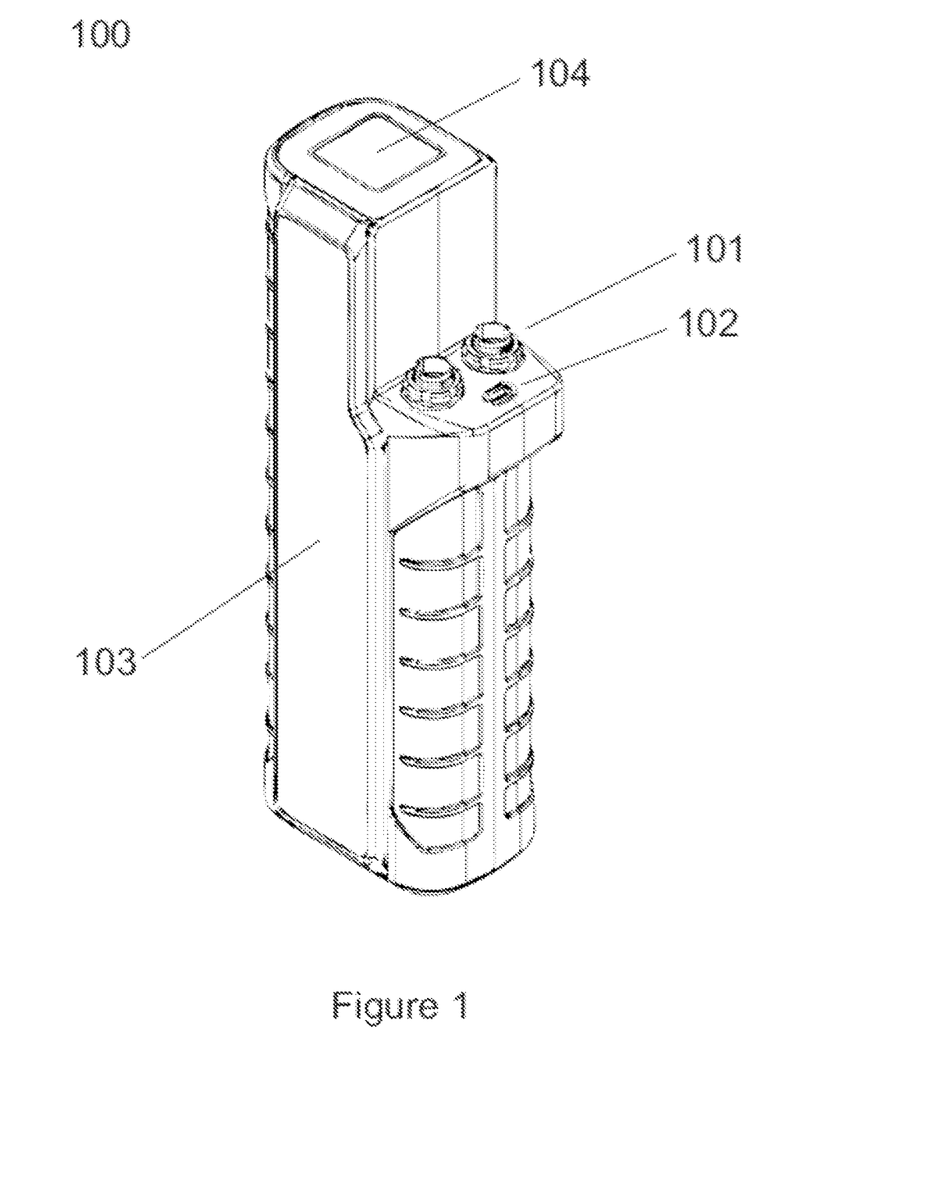
FIG. 1 shows an embodiment of a single energy share pack.

Referring to FIG. 1, an energy share pack (100) is shown which has a size and shape similar to common ammunition carriers used by soldiers. The advantage of mimicking the size and shape of existing fielded equipment is the ability to re-use existing pouches and attachment devices already in use by the military for such ammunition carriers. In this way, soldiers do not have to re-distribute and reconfigure their load carriage system when deciding to carry more energy (batteries) or more ammunition into a specific mission. Each energy share pack includes at least one connector but may also include additional connections. The embodiment shown in FIG. 1 includes two round connectors (101) and one mini-B type USB connector (102). These connections are shown on one side of the energy share pack, but could exist on each side of the energy share pack as shown later in FIG. 2.

The connectors (101, 102) include electrical contacts, which can transfer power and information between each energy share pack (100) or connected equipment. The connections allow bi-directional transfer of energy in and out of the energy share pack through adaptive energy circuits that allow multiple pieces of equipment to operate from a single energy share pack where the equipment may include users of energy such as radios and lights, and the equipment may include generators of energy such as solar panels or fuel-cells. A combination of energy users and energy generators may be connected to the energy share pack simultaneously and at different voltage and current levels.

FIG. 1 shows additional features of the energy share pack including a large volume in the body (103) of the energy share pack for storing electricity. The preferred embodiment utilizes rechargeable Lithium Cells (not shown) as an energy storage component located within the body (103) of the energy share pack to store energy. A display (104) provides information to the user, the display includes information from the individual energy share pack, and also for any other communication enabled energy share packs that are connected together to make a complete system. The display (104) may also provide information and control options for equipment connected to the energy share pack such as power usage, power generation, state of health, power priority levels, control and communication relay functions.

Figure 2:
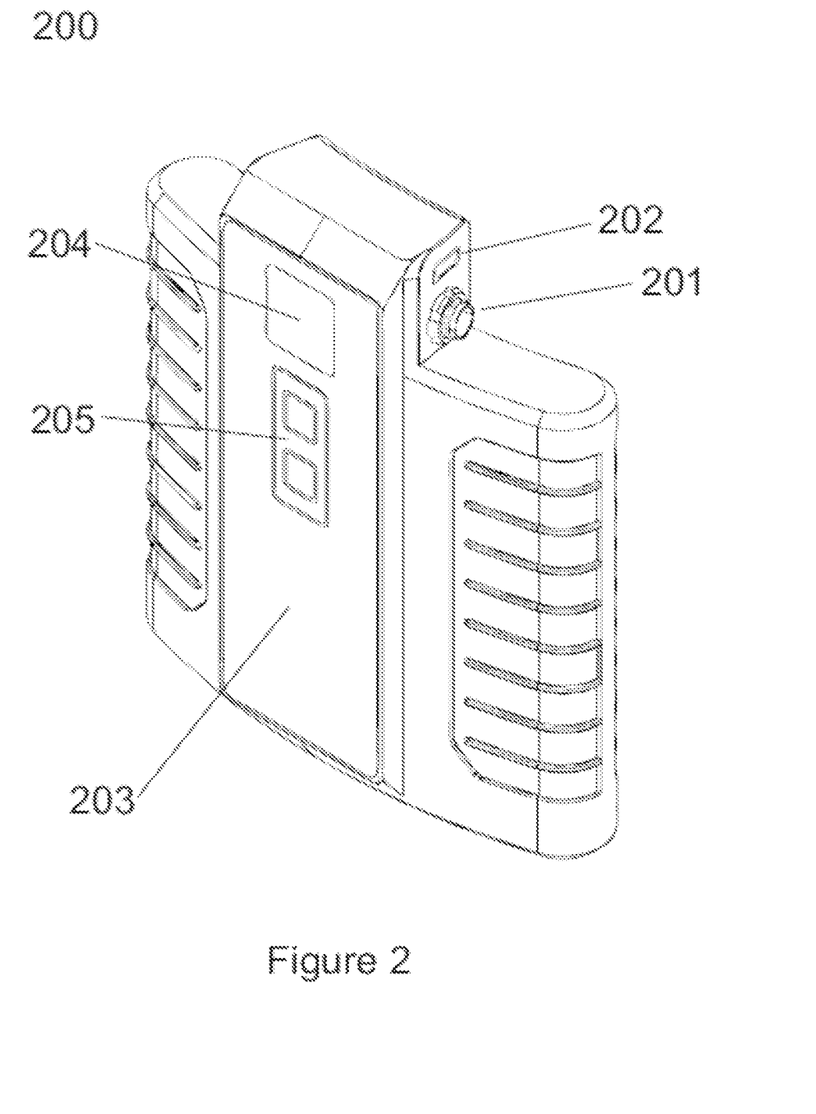
FIG. 2 shows another embodiment of a single energy share pack.

FIG. 2 shows an alternate embodiment of an energy share pack. In this case the energy share pack (200) is curved to fit the natural shape of the wearer's body. This alternate embodiment matches the typical form of a body armor plate often used in the military within a side-plate carrying pocket. The advantage of mimicking the size and shape of existing armor plates is the ability to re-use existing pouches and attachment devices already in use by the military for such armor plates. In this way, soldiers do not have to re-distribute and reconfigure their load carriage system when deciding to carry more energy (batteries) or more armor into a specific mission.

The alternate embodiment includes the same information display (204), round connector (201) and USB connector (202) as shown in FIG. 1. The preferred embodiment utilizes rechargeable Lithium Cells (not shown) as an energy storage component located within the body (203) of the energy share pack to store energy. As can be seen, the size, shape and thickness of the energy share pack (100, 200) can be varied without interfering with the overall operation of the system. In this way different types, abilities and capacities of energy share packs may use a common connection system and be combined into a nearly infinite number of combinations that suit the needs of the user for their particular mission profile.

FIG. 2 also shows two buttons (205) which can be used to configure the energy share pack (200) for different modes of operation, or for general interaction with the system by the user. More or fewer buttons may be present depending on the input required.

Figure 3:
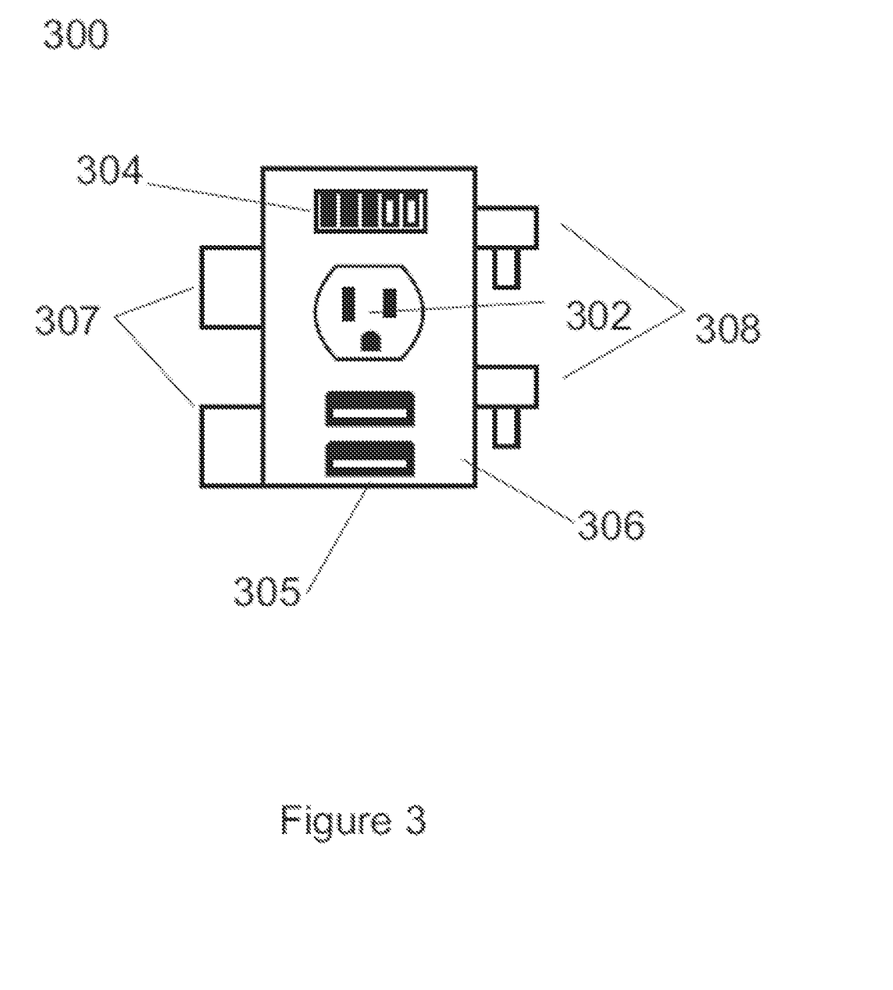
FIG. 3 shows two examples of energy share packs.

FIG. 3 shows an alternate embodiment of the energy share pack (300) In this case the energy share pack (300) includes a 110VAC plug (302) as shown. This energy share pack contains an energy conversion component, such as an inverter, which could take energy from other energy share packs in the system, or from energy stored within the energy share pack's body (306) and convert that energy to a form that would allow standard household equipment including a television, computer, light or coffee maker to be plugged into the system directly. The 110VAC plug (302) can also be bi-directional allowing the system to be recharged from high voltage alternating current or direct current sources. The energy share pack also includes a simple capacity display (304) which tells the user how much energy is contained in the system. The display could include a simple bar graph as shown, or it could include a full display capable of text and graphic information as previously shown in FIG. 1 and FIG. 2. The energy share pack also includes two USB ports (305) which could be used to charge compatible devices such as cellular phones and music players. The USB ports (305) can also be used for communication purposes to monitor, diagnose, recharge and control the complete power system.

FIG. 3 could also represent an Accessory Element where the function is communication, or the playing of media such as music or video.

The energy share pack (300) of FIG. 3 include electrically active hinge points (307, 308) which allows the energy share pack (300) to connect mechanically and electrically to another energy share pack with similar connection points, or to a user or generator of energy such as a radio or solar panel that is equipped with compatible connection points. This results in an overall system that is flexible, even though it may be made from multiple rigid segments.

Figure 4:
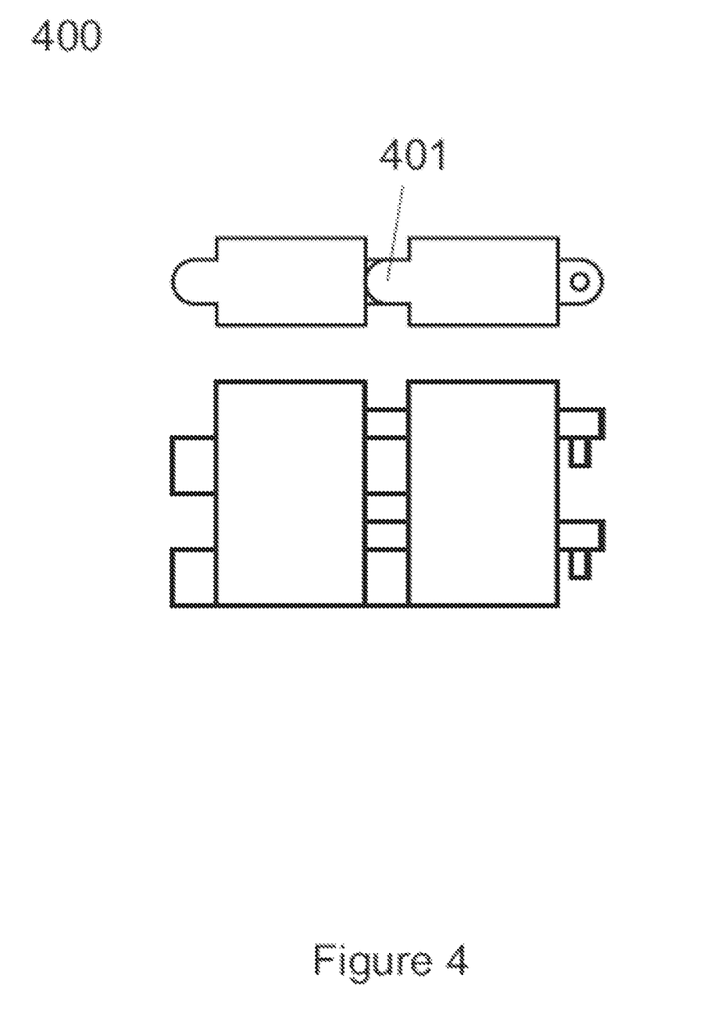
FIG. 4 shows two energy share packs connected by a hinge.

FIG. 4 shows two energy share packs (400) connected together by the common hinge point (401). As previously discussed, the connection point, for connecting to more than one of energy users, energy sources and other energy share packs simultaneously for sharing energy may take many forms, such as a hinge, a flexible cable connector, or a rigid connector. In this case it can be seen that the energy share packs can be connected together into an assembly without the need for any other carriers, equipment or pouches. The energy share packs may be connected together in combinations that include dedicated energy storage, energy transfer, voltage converters, combinations of energy storage and energy conversion and accessories that use energy or generate energy for the rest of the system. The connections can be in any order and can form long open chains, multiple smaller chains, or can be looped back on itself to form a closed belt.

The hinge point itself is an example of a connection point, and may be constructed in a variety of ways including the use of a pin-and-socket as show in the figures, or through the use of ball joints, flat cables, flexible material, wires, compressible material, dove-tail joints, magnets and other similar means or combination of means that can provide a combination of both mechanical and electrical connection between the energy share packs.

Figure 5:
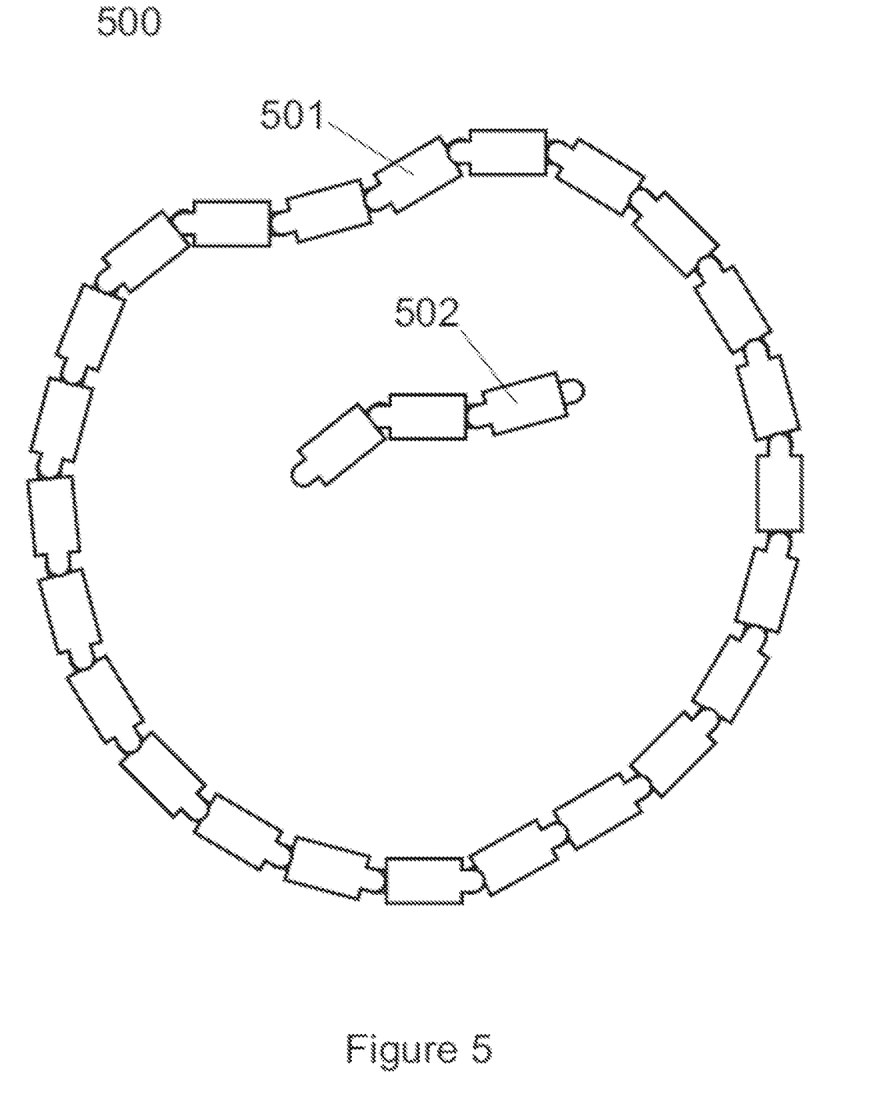
FIG. 5 shows multiple energy share packs configured as a belt.

FIG. 5 shows how multiple energy share packs can be connected into a complete system (500) in this case a belt (501) is constructed from 24 individual energy share packs. These energy share packs may be a variety of energy storage and accessories, combined in any combination, the individual energy share packs that make up this system do not need to be the same or include the same features as each other. The connection points between each energy share pack allows them to pivot and therefore the entire system can conform to the shape of the body or anything else that it is placed in, on, or around.

A second set of energy share packs is connected together into a short independent group (502) which could be composed of extra energy share packs which are not needed, or could be broken off from the main power group in order to power some auxiliary systems (not shown).

It can be appreciated in FIG. 5 that a nearly infinite arrangement of energy share packs can be achieved to provide a person with the appropriate length of belt, the ability to power auxiliary equipment and the ability to choose how much energy to store, and what accessories are required in each system.

Figure 6:
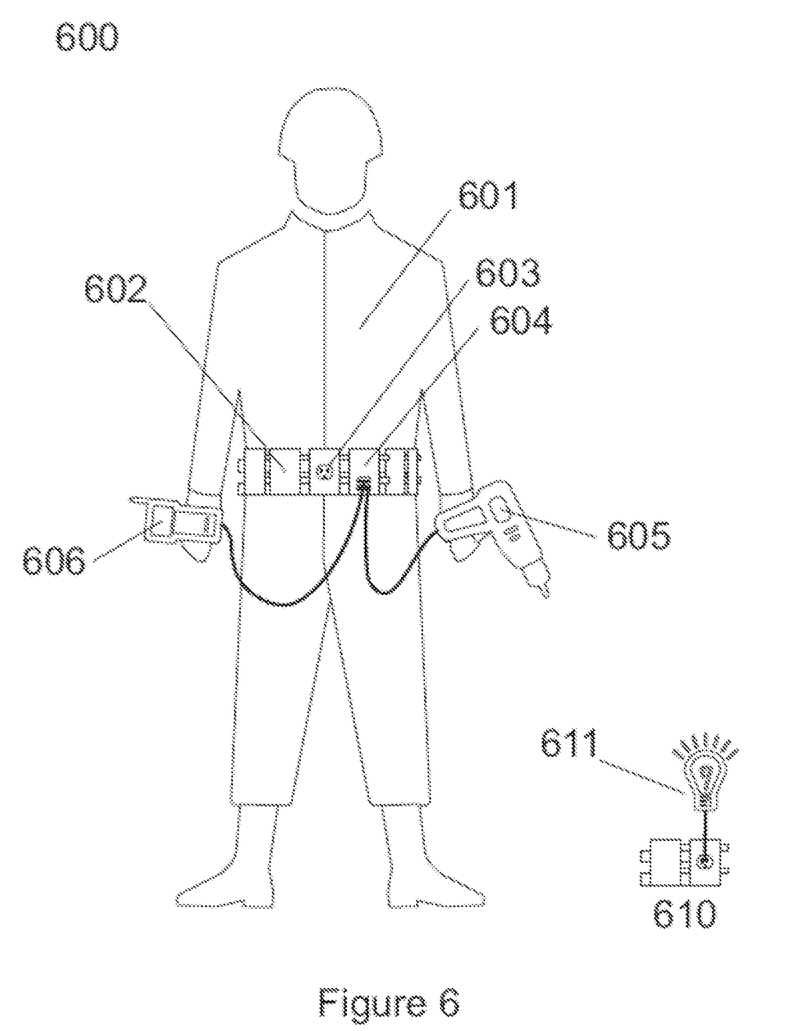
FIG. 6 shows an example of the energy share packs in use.

FIG. 6 shows an example system (600) in typical use by a user (601). The energy share pack is arranged in a belt configuration (602) and is being worn on the user's waist, but could be worn in other locations or even broken up into several separate energy share packs which are, for example, stored in pouches on a shoulder belt. This user has elected to include an energy share pack with 110VAC inverter (603) and a energy share pack with multiple power ports (604) which has been connected to a power drill (605) and to a hand-held communicator (606). For military personnel individual energy share packs can be placed in pouches or otherwise attached to the existing load carriage system. Electrical connections between energy share packs can then be made using conventional wired connections, or through electrically active materials embedded in the vest or in the housing or hinges of the share packs themselves.

It should also be noted in FIG. 6 that the user (601) has removed two energy share packs from the system to create a smaller sub-system (610) which is being used to power an auxiliary light (611).

Figure 7:
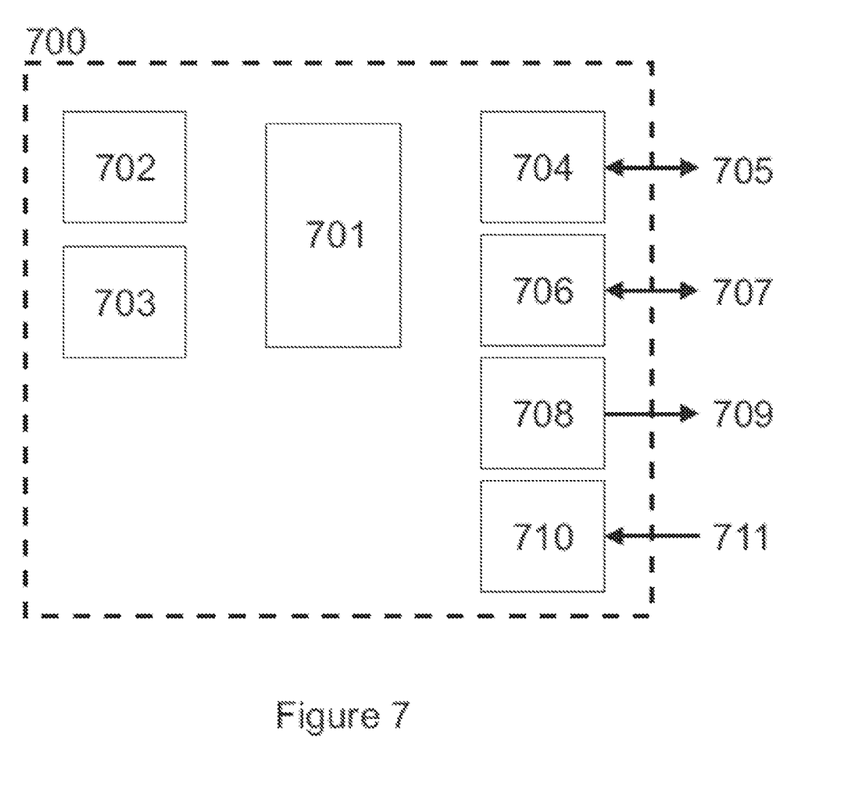
FIG. 7 is a block diagram of a single energy share pack.

To achieve the desired goal of a flexible and scalable power system that includes flexible power storage combined with power conversion and accessory elements in one convenient and highly flexible system that allows for a nearly infinite number of possible configurations to suit any power need, a bi-directional power capability is required. FIG. 7 includes a block diagram of the elements internal to the energy share pack (700) shown enclosed by a dashed line, these elements are used to provide the full flexibility required in share pack.

The energy storage element (701) may be composed of rechargeable cells or batteries based on lithium, nickel, cadmium, lead, or other chemistries. The energy storage element (701) may also be non-rechargeable such as a fuel cell, alkaline, zinc, silver or other chemistries. Energy storage may also be a combination of rechargeable and non-rechargeable technologies.

Energy share pack (700) includes a display (702) which, at the least, indicates the state of charge of the storage element (701) but may include more detailed information with respect to the power flowing into and out of the individual share pack, and may include information on the rest of the system when more than one device is connected together in the form of a complete energy system. Optionally one or more buttons (703) may form part of a more complex user interface.

Unlike conventional batteries that have only a single output, the energy share pack includes multiple inputs and outputs at different voltage and current levels. For example, the energy share pack shown has more than one energy transfer element which may include inputs, outputs and bidirectional ports. Each port may have its own set of voltage and current characteristics.

A first example of an energy transfer element is a bidirectional power circuit (704) which connects to the bidirectional power port (705) which delivers energy to a load at voltages above 10 volts, and will accept energy at a wide range of voltages. This allows energy generation devices such as solar panels to be connected directly to the energy share pack without a specialized charge controller. This also allows loads to be connected to the energy share pack such as a lamp, radio or computer, without specialized voltage adapters or power conversion hubs.

The bidirectional power port may optionally produce voltages that include alternating current (AC) power at 110V or 220V similar to that found in a standard household wall socket and the bidirectional power port (705) may accept power in this range. Even higher voltages may be required in some situations such as power taps attached directly to overhead power lines at potentials of thousands of volts. Power accepted though the bidirectional power port (705) may be used to recharge the energy storage element (701) or it may be used to provide energy to the other energy transfer elements (706, 708, 710), or a combination of both. Other energy share packs in the system may be connected to one or more of the power ports (705, 707, 709, 711) and may themselves accept or supply energy through these ports, enabling true sharing of energy among all energy share packs in the system.

Another example of an energy transfer element is a bidirectional USB circuit (706) which connects to the bidirectional USB port (707) which allows fixed voltage devices to be connected and operated by share pack. The bidirectional USB port (707) will deliver USB compatible voltage (typically 5 volts) to a load. The USB port will also accept energy at the typical 5 volt range produced by computers and plug-in USB chargers. The USB port may optionally include a wider voltage range, for example it may allow voltages that are both higher and lower than 5 volts to be received such that energy harvesting devices including kinetic, chemical, wireless, wind and others can be connected to this port, even if their output voltage varies considerably and rapidly over time. Power accepted though the bidirectional USB power port (707) may be used to recharge the energy storage element (701) or it may be used to provide energy to the other power circuitry (704, 708, 710), or a combination of both.

Another example of an energy transfer element is a unidirectional output power circuit (708) which connects to unidirectional output power port (709) with the direction of energy flow shown by an arrow, and provides output only to loads at any voltage or current level required by the application. The unidirectional output port (709) may be configured for a fixed voltage, current or power profile. Or it may be configured for a variable voltage and power output. The output power port (709) may take the form of a USB charger port, providing a fixed, typical 5 volts output and may have the USB data lines configurable to emulate chargers for devices such a iPhone, iPod, cell phones and tablets that require specific manipulation of the USB data lines.

Another example of an energy transfer element is unidirectional input power circuit (710) which connects to unidirectional input power port (711) and provides an input charging path for the energy storage element (701) and may also supply power to other energy transfer elements (704, 706, 708). The energy direction is shown by the direction of the arrow. Energy may be accepted at a variety of voltages and power levels and may be fixed or adjustable. Maximum power point tracking or other energy harvesting optimization methods may be used to ensure energy generators connected to this port, or to the bidirectional ports, are utilized at their most efficient operating point.

The connection points on an energy share pack may connect to energy generation components such as solar panels, fuel cells and a variety of energy harvesting devices. It is envisioned that some of these devices may be included inside the device itself, allowing for an energy share pack system which is capable of recharging itself. For example, if an energy share pack device includes kinetic energy harvesting, it will generate energy through the motion of the soldier that is wearing it. If two energy share packs are connected together, the kinetic harvester in one energy share pack may route energy to the other share pack, allowing it to recharge, truly sharing energy as required.

Each power port (705, 707, 709, 711) may include communication. For example, CAN bus architectures would allow multiple energy share packs to communicate with each other, and with connected equipment, forming a complete power network where each device in the network is aware of other devices in the network. The CAN Bus architecture is particularly well suited for this application as all communication lines operate in parallel. Therefore energy share packs and equipment can be added to the system or taken away without the need for manual configuration of the system by the user.

As an energy share pack is added to the system, the protocol allows automatic discovery. Other communication networks, protocols and interfaces may also be used to form this network including Ethernet, SMBus, USB, power line data, and wireless protocols. Dedicated communication protocols and mixed protocols may also be used, for example CAN bus may be implemented on one connector while USB communication is implemented on another connector. The communication protocols may also be automatically switched, for example a port connected to a computer may be configured for USB communication, but would then switch to SMBus communication when it detects a SMBus compatible host.

Communication allows energy storage, acceptance and delivery to be managed by all energy share packs as a whole, without the need for a separate power manager system. Communication is key to the ability to share energy as needed. For example, a solar panel connected to the input power port (711) of one energy share pack may produce energy that is routed out of the output power port (709) of that energy share pack and into the bidirectional power port (705) of a different energy share pack that has a low state of charge. In this way an energy share pack with a low state of charge may be recharged using a solar panel that is connected to a different energy share pack.

The user does not have to consider which energy share pack they have attached the energy generator (solar panel) to, instead the energy share pack system will utilize and manage all available energy storage, energy source and energy load devices together as a single system.

In a field situation, a soldier may have one energy share pack located in their backpack with a solar panel attached. This energy share pack would recharge from the solar panel. If the soldier then adds a second energy share pack to the front of their vest, that energy share pack can also charge from the solar panel through the energy sharing circuitry. When the energy share pack in the backpack is completely full, all energy from the solar panel will automatically be directed to the energy share pack on the front of the vest. The soldier does not need to stop and remove their vest and backpack to reconfigure (through manual manipulation of the wires, interface, connectors or switches) their system. This is a major safety advantage as removing their vest also means removal of armor, leaving the soldier unprotected and vulnerable.

The means and order of operation with respect to energy sharing is programmable and configurable. The soldier may elect to keep all energy share packs at the same state of charge. In this mode of operation energy will be routed from an energy share pack with more energy to an energy share pack with less energy. This ensures that removal of one energy share pack from the soldier at any time will leave the maximum amount of energy on the soldier, regardless of which energy share pack is removed.

Alternatively, or additionally, the soldier may elect to keep one energy share pack at a full state of charge at all times. Loads on the soldier are therefore powered by the other energy share packs on their body. If the soldier is in a situation where they need increased speed and mobility, they can then drop exhausted energy share packs from their body, reducing their burden, while retaining the energy share packs that have the most energy remaining.

The communication between energy share packs may also be extended to the devices connected to the energy share pack. This allows devices to request, utilize and display information about the total energy system such as state of charge and state of health. Communication may also allow the devices connected to configure share pack ports on-the-fly for input, output, voltage, current and power levels as required by the application.

Power management and prioritization may therefore be accomplished using energy share packs without the need for a separate power management or switching hub. Rather, equipment communicating with an energy share pack can set priority levels which allows an energy share pack to take action under certain programmed conditions such as turning off or dimming a lamp when the state of charge of the system falls below a certain point in order to save energy for higher priority devices such as radio beacons.

In order to meet the goals of the invention, a reconfigurable battery pack and power system that would allow the user to combine batteries in a wide variety of ways to provide the exact voltage, current, capacity, size, weight and form factor that the user requires at that time, it is necessary for an energy share pack to have at least two energy ports which can be a combination of those listed above. For example, an energyshare pack could include two bidirectional USB ports along with their associated energy transfer elements, or it could include one bidirectional USB port and one bidirectional power port, or it may include three, four, or more ports on each share pack.

The ports to be chosen from would include: bidirectional power port, bidirectional USB port, unidirectional output power port, unidirectional input power port. The energy transfer elements may be as simple as a conductive path to the internal energy storage component of the energy share pack, or the energy transfer elements may be very complex including fully programmable and bidirection power conversion circuitry.

Although the term port is used to indicate an input, output or bi-directional energy connection to a share pack, it can be understood that such ports may be physically combined into a single connector that includes multiple conductors, or broken in to separate connection points that may only include one conductor each. Such connectors are available with anywhere from one to several hundred separate connection points, bundled into a single convenient connector. The ports of share pack may also be physically separated (as shown in FIG. 1 and FIG. 2) and may have common parallel connections between them such as sharing common ground, common communication and/or common power paths between them.

When used in the field, multiple users could come together and combine their energy share packs to form much larger or specialized power network capable of powering much larger systems. It is envisioned that soldiers in field could come together to create a temporary power system for a satellite system, radar jammer or to provide enough energy to start or power a vehicle.

Although the description above contains much specificity, these should not be construed as limiting the scope of the invention but as merely providing illustrations of the presently preferred embodiment of this invention. Thus the scope of the invention should be determined by the appended claims and their legal equivalents.

We claim:

1. An energy system comprising:

first and second interconnectable energy devices that share energy and can be connected to form a chain, each of the first and second interconnectable energy devices comprising:
  a. a body having at least one connector configured to engage a separate energy device;
  b. at least one energy storage component within the body, wherein the at least one energy storage component is in communication with the at least one connector;
  c. an energy conversion component within the body;
  d. a plurality of independent connection points configured to connect to a plurality of energy users and energy sources, wherein the plurality of independent connection points are electrically active hinge points that hingedly and electrically connect the energy device to one or more energy devices, wherein each of the plurality of independent connection points have an independent voltage; and e. an integrated display that displays information regarding the energy device and other energy devices connected thereto.

2. The energy system of claim 1, wherein each of the first and second interconnected energy devices further comprises two or more ports for transferring energy, the ports comprising at least one of a bidirectional power port, a bidirectional USB port, a unidirectional output power port, and a unidirectional input power port.

3. The energy system of claim 2, wherein at least one of the ports is adapted to communicate data.

4. The energy system of claim 2, wherein the ports operate simultaneously at different voltage levels.

5. The energy system of claim 1, wherein the first and second energy devices are wearable.

6. An energy system comprising:
first and second interconnectable energy devices that share energy and can be connected to form a chain, each of the first and second interconnectable energy devices comprising:
   a. at least one energy storage component for storing energy;
   b. at least one energy generation component for generating harvestable energy;
   c. two or more ports, each port selected from the group consisting of a bidirectional power port, a bidirectional USB port, a unidirectional output power port, and a unidirectional input power port;
   d. a plurality of electrically active hinge points that hingedly and electrically connect the energy device to one or more energy devices; and
   e. an integrated display that displays information regarding the energy device and other energy devices connected thereto.

7. The energy system of claim 6, wherein for each of the first and second interconnectable energy devices, energy from the at least one energy generation component shares energy with connected devices.

8. The energy system of claim 6, wherein for each of the first and second interconnectable energy devices, energy stored in the at least one energy storage component is shared with connected devices.

9. The energy system of claim 6, wherein for each of the first and second interconnectable energy devices, the two or more ports operate simultaneously at different voltage levels.

10. The energy system of claim 9, wherein for each of the first and second interconnectable energy devices, at least one port is bi-directional.

11. An energy system comprising at least two interconnected battery packs that share energy and are connected to one another with an electrically active hinge point, each battery pack comprising at least one power port for connection to external equipment, the at least one power port selected from the group consisting of a bidirectional power port, a bidirectional USB port, a unidirectional output port, and a unidirectional input port, wherein one or more of the two or more battery packs further comprise an integrated display for providing information regarding the battery packs and other battery packs connected thereto, and wherein the information provided is selected from the group consisting of total energy stored in the system, total energy used by the system, total energy generated by the system, total health of the system, total available operational time of the system, total time to recharge the system, number of active connections in the system.

12. The energy system of claim 11, wherein the system is adapted to be carried in ammunition carriers.

13. The energy system of claim 11, wherein the system is curved and adapted to be fit into armor plate pockets.

14. The energy system of claim 11, wherein the hinge point comprises at least one of of pin-and-socket, ball joints, flat cables, dove-tail joins, and magnets.

15. The energy system of claim 11, wherein the at least two battery packs can be connected together at any state of charge.

16. The energy system of claim 11, wherein an operating voltage level of each power port is independent from an operating voltage level of another power port.

17. The system of claim 11, wherein data is transferred between the at least two battery packs.

18. The system of claim 11, wherein energy is stored, routed, input, output and harvested between the two or more battery packs.

* * * * *

UNITED STATES PATENT AND TRADEMARK OFFICE
CERTIFICATE OF CORRECTION

PATENT NO. : 9,680,318 B2
APPLICATION NO. : 13/967238
DATED : June 13, 2017
INVENTOR(S) : Steve Carkner et al.

It is certified that error appears in the above-identified patent and that said Letters Patent is hereby corrected as shown below:

Column 10, Claim 11, Line 23, Insert --and-- before "number".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*